April 30, 1968  H. Z. HIGHT ET AL  3,380,762
INSULATED PIPE JOINT

Filed Sept. 22, 1965  3 Sheets-Sheet 1

INVENTORS
HANFORD Z. HIGHT
PETER J. KASSAK
BY STEPHEN LESKY
Richard S. Shreve, Jr.
ATTORNEY

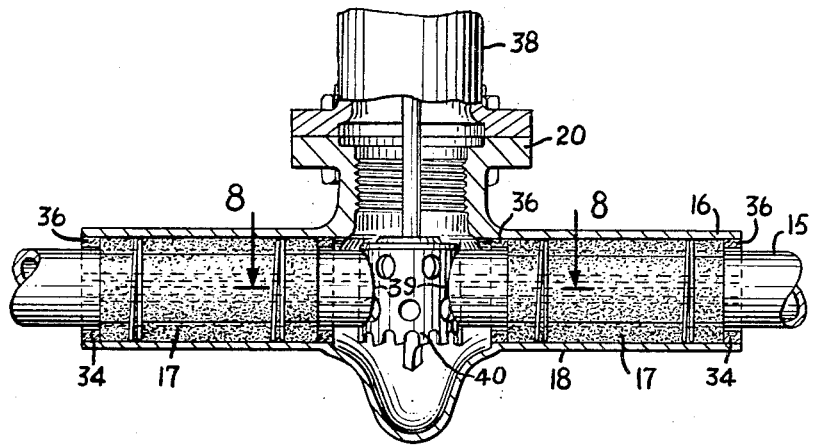
FIG. 6
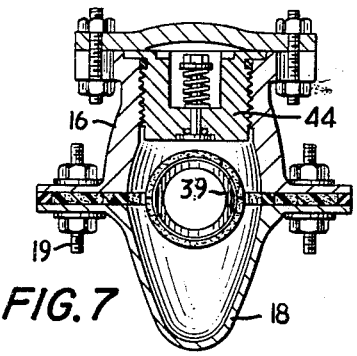
FIG. 7
FIG. 9
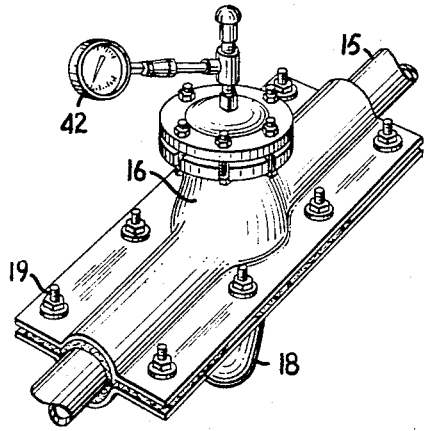
FIG. 8
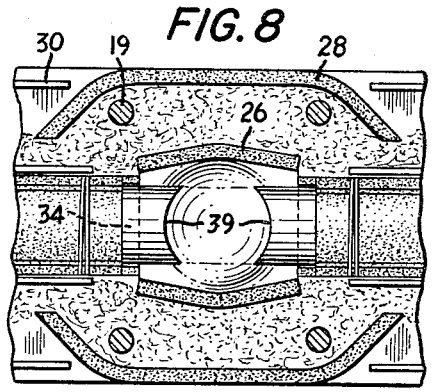
INVENTORS
HANFORD Z. HIGHT
PETER J. KASSAK
STEPHEN LESKY
BY
*Richard S. Shreve Jr.*
ATTORNEY April 30, 1968   H. Z. HIGHT ET AL   3,380,762
INSULATED PIPE JOINT
Filed Sept. 22, 1965   3 Sheets-Sheet 3
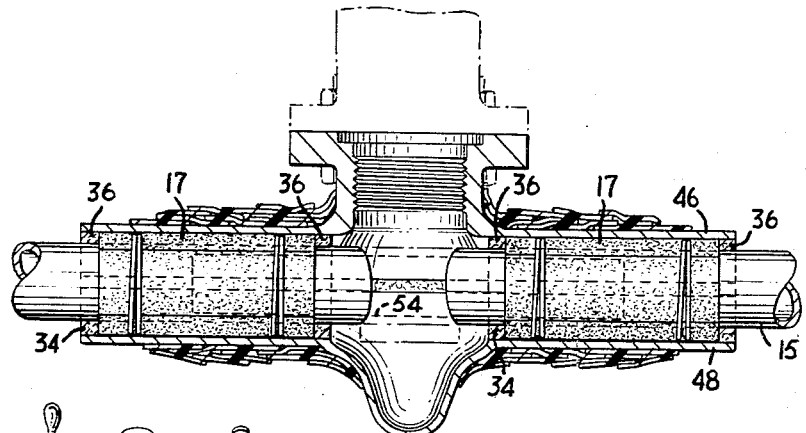
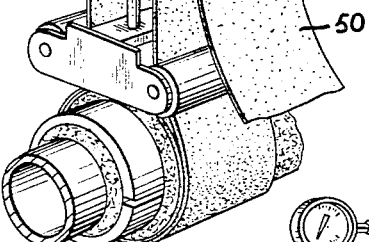
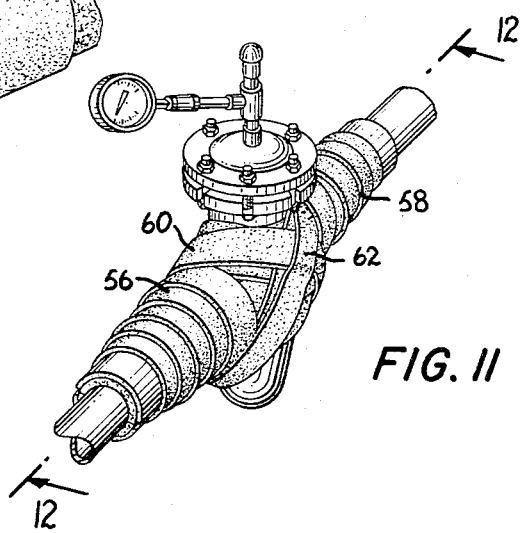
INVENTORS
HANFORD Z. HIGHT
PETER J. KASSAK
BY STEPHEN LESKY
Richard S. Shreve, Jr.
ATTORNEY United States Patent Office 3,380,762
Patented Apr. 30, 1968

3,380,762
INSULATED PIPE JOINT
Hanford Z. Hight, South Orange, Peter J. Kassak, Berkeley Heights, and Stephen Lesky, Metuchen, N.J., assignors to Bonded Products, Inc., South Orange, N.J., a corporation of Illinois
Filed Sept. 22, 1965, Ser. No. 489,805
12 Claims. (Cl. 285—53)

ABSTRACT OF THE DISCLOSURE

Insulating pipe joint by wrapping pipe with insulation, applying split bridge T thereover, and sealing to the T stem an enclosed drilling machine having a cutter entering the T stem to sever a section of the pipe therewith in the T below said stem.

---

This invention relates to insulated pipe joints, and more particularly to method and apparatus for interrupting the electrical continuity of a pipe and insulating the interrupted ends from each other.

Electrical current in underground service pipes may come from galvanic action in the soil, stray current picked up from electric railroads, or from houses where the electrical system is normally grounded to the water pipe, and the current then goes out through the water heater into the gas service line. Unfortunately, when this current jumps off the pipe, it takes some metal with it, so that if there is sufficient current and other conditions are favorable to corrosion, a hole will develop in the pipe fairly rapidly, causing a leak therein.

To cope with this problem it is desirable to break up the continuity of the pipe so that the current cannot accumulate to be of significant amount. It is also desirable to apply cathodic protection by introducing current into the line, and then take it off at a controlled point, so that no corroison takes place. For these purposes, insulating joints are installed at spaced points along the line.

When it is desirable to cut in an insulating joint in an existing main buried in the ground, it is also desirable to avoid interrupting the gas service. For this purpose, a line stopper such as manufactured by the Mueller Company is used. As shown in Patent No. 2,171,942, this stopper provides in effect a valve or shut-off in the line. The stopper is welded onto the line and then a Mueller machine as shown in Brandriff Patent No. 1,898,935 which can cut and perform other functions without gas flow into the atmosphere is used to cut out the section of pipe. This cut-out section of pipe is held in place in the shell cutter used and is withdrawn through a valve. Then the stopper is inserted back through the valve and applied in the pipe to effect the shut-off. Two stoppers are required, one on each side of the specific point where the insulating joint is going to be installed. After the stoppers have been installed and gas flow is stopped for a short distance, then the cut is made in between the stoppers and the insulating joint put in. Obviously this operation would shut down service. To avoid this a by-pass arrangement is frequently installed, joining the pipe on the outside of each stopper and a temporary pipe laid to carry the gas while the work is being done.

This procedure involves digging three holes: one for each of the two stoppers and one for the insulating joint; or a very large hole in order to put on the three fittings. There is considerable cost of digging the holes and repaving. It is also necessary to have a welder there to put on the two fittings. There is also the problem of making sure that gas service is maintained. In the larger sizes, say above four inch, the cost of the three fittings in itself is an item. However, the main problem is the matter of either three separate holes or the larger hole and the amount of work that has to be done to accomplish this.

It is therefore the main object of the present invention to provide one fitting to do the work of the three without any interruption of service.

Other objects are to provide a more positive insulated pipe joint, and to simplify and improve the operation of installing the same.

According to the present invention, a length of the pipe to be so insulated is exposed, spaced portions of the exposed length are encircled with adhesive insulating material reinforced with high tensile strength insulating fiber, and a split bridge T pipe fitting is applied to the outside of such encircled portions. Before the reinforced adhesive can set up, the split T bridge parts are clamped together over the reinforced adhesive, so that when the cure takes place it bonds the split bridge to the pipe through the reinforcement.

The adhesive insulating material is preferably epoxy resin or the like, such as a polyester or similar fast setting strong adhesive, and the reinforcement insulating fiber is preferably glass roving or woven glass cloth.

The clamping action may be caused by bolts passing through lateral flanges on the respective parts of the split bridge, and permanently installed therewith. But I prefer to employ canvas belts wrapped around the split parts and pulled up tight, to hold the split parts together while the same are being wrapped with insulating fiber reinforced insulating adhesive, and removed after the adhesive has set and before the finished insulating joint is put into service.

This application of the reinforced adhesive, particularly epoxy resin and glass cloth or woven roving, provides tremendous holding strength because of the adherent high adhesion of epoxy resin so that there is no danger of later pull-out. Furthermore, the adhesion of the epoxy resin gives assurance that no gas will leak out of the device. Another feature is that this combination of epoxy resin and glass cloth has a very high dielectric strength—450 to 500 volts per mil. This means that a very high caliber insulation is provided.

After the device is installed on the pipe, it can be air tested to make sure there is no leakage. This is accomplished by attaching an air supply to the flange on the top of the device. The pressure can be applied to whatever degree is required according to the codes and standards followed. When it has been determined that the device has been installed and is air tight, then the next step can be taken.

A conventional type of enclosed pipe cutting machine—a machine to cut pipe under live gas pressure—is used. The most widely used type is the one manufactured by the Mueller Company. This can do all the work without gas flowing into the atmosphere or against the operator. Now we attach a shell cutter which has a diameter larger than the pipe diameter. For example on 2" pipe which has an outside diameter of 2⅜", a 3¼" shell cutter is used so that when it cuts through the pipe it is certain to completely sever the pipe and actually leave a space between the closest ends of the severed pipe. Once the severed section of pipe is removed the insulating joint is effective. The operation is completed by removing the shell cutter with the severed section of pipe out through the valve, closing the valve, and then putting a plug on the enclosed drilling machine, and inserting this plug in our device through the valve. The shell cutter has holes in it which permits the constant flow of gas through the shell cutter as the cutting operation is being performed so that gas supply is not shut off. These holes equalize pressure on either side of the cutter so that the cutter will not jam against the pipe on the downstream side of the hole it is cutting.

To sum up, one fitting is used to replace three fittings and three holes, or at least a much smaller hole than would be required to put on the three devices, the two stoppers and the insulating joint. There is no interruption of service. A welder is not required on the job. An important advantage is the fact that because of the nature of our device, we have as much as ½" or more thickness of this epoxy impregnated glass cloth so that the insulating properties are tremendous. Actual tests show that on 2" pipe we get infinite resistance. In the case of the insulating flanges or other prior devices the insulator may be only ⅛" thick or the like so that failure is very possible. Our device provides heavier insulation, and continuous reinforcement—like welding, particularly larger pipes.

In the drawings:

FIGURE 6 is an axial section through the pipe and the closed fitting;

FIGURE 7 is a transverse section through the fitting with the stem thereof plugged;

FIGURE 8 is a section taken along the line 8—8 of FIGURE 6;

FIGURE 9 is a perspective view of the completed joint being tested;

FIGURE 10 is a perspective view of a modified clamp;

FIGURE 11 is a perspective view of a modified insulating joint which is the preferred embodiment of the present invention; and FIGURE 12 is a vertical section taken along the line 12—12 of FIGURE 11.

Figure 1:
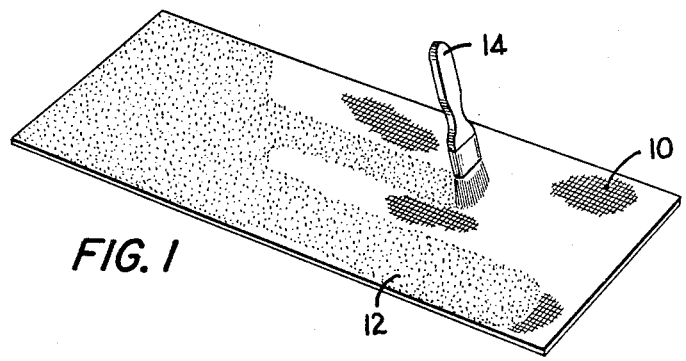
FIGURE 1 is a perspective view of a length of glass cloth with resin being applied thereto with a brush.
Figure 2:
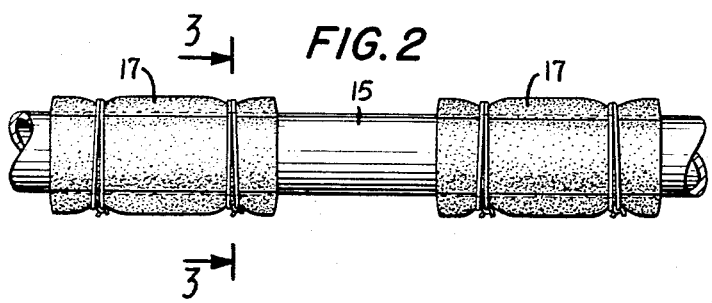
FIGURE 2 is a side elevation of the resin saturated glass cloth wrapped around the pipe.
Figure 3:
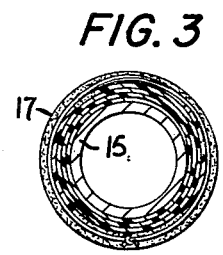
FIGURE 3 is a transverse section taken along the line 3—3 of FIGURE 2.

As shown in FIGURE 1, a length of tensile reinforcing material 10 such as glass cloth is spread out flat on a supporting surface, and plastic insulating material 12 such as epoxy resin is applied thereto with a stick, spatula, or brush 14 to the point of saturation of the glass cloth. The resin saturated glass cloth is wrapped around the pipe 15 at two spaced positions as shown in FIGURE 2, and tied down with string to form spaced wrappings 17.

Figure 5:
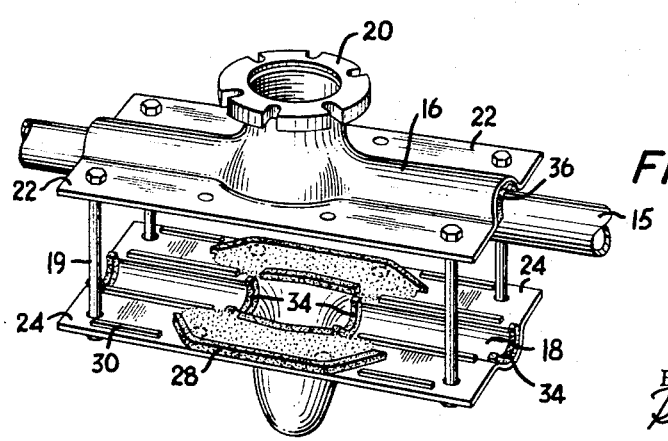
FIGURE 5 is a perspective view of the open split bridge T fitting.

The wrappings 17 are clamped by bolts 19 between mating portions 16 and 18 of a split bridge T fitting shown in FIGURE 5. The upper portion 16 is integral with the stem 20 of the T, and is provided with lateral longitudinal flanges 22 mating with similar flanges 24 on the lower bridge portion 18. These portions clamped over the wrapped insulation 17 would effect a gas seal against longitudinal leakage, but the space in between the ends of the two wrappings 17 would provide lateral leakage. For this reason additional plastic insulating material is applied between the flanges at this point.

Figure 4:
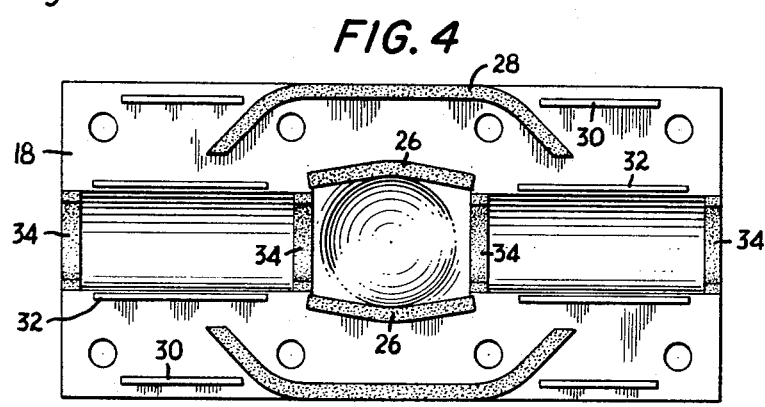
FIGURE 4 is a plan of the bottom half of a split bridge T fitting.

As shown in FIGURE 4, an inner dam 26 and an outer dam 28 of elastic material such as rubber are provided between the mating flanges to restrict the lateral flow of the plastic insulating material. This provides a convenient space in which is spread an epoxy resin reinforced with glass roving, applied with a spatula to fill completely the area defined by the dams to the height of the dams.

Also adhesive thickness spacers 30 of rigid material such as metal are provided between the mating flanges on each of the outside ends and similar spacers 32 along the pipe on either side of the center to prevent the mating portions from being bolted up so tight as to squeeze out the resin from the glass cloth.

FIGURE 4 also shows semicircular stops 34 applied to the bottom half, and similar stops 36 are applied to the top half of the semicircular bridge sections which fit around the pipe, at each end of the wrappings 17. These stops are of reinforced insulating material such as epoxy resin saturated glass cloth.

These stoppers are of sufficient height to prevent pulling up of the halves of the bridge to the point of squeezing out the resin. These are in addition to the spacers 30 and 32, because any distortion of the side flanges would not make certain that proper take up is applied onto the woven roving. There should be sufficient pressure for completely intimate contact, but not enough to squeeze out or wring out the resin which is still in liquid form, before cure, when the halves are installed.

After the two halves are drawn up against the saturated woven roving, time must be taken for the epoxy resin to cure. To expedite the curing, a plumber's torch or similar device may be played over the entire insulating fitting until the steel is warm to the touch. This gives a temperature which will cure the material in one hour's time.

As shown in FIGURE 6, after the resin has cured, an enclosed drilling machine 38 is secured to the stem 20. The machine 38 is provided with a shell cutter 40 of greater diameter than the pipe 15. This completely severs the pipe, by removing a section thereof between the spaced pipe ends 39. The severed section is removed with the shell cutter 40, and the enclosed drilling machine is removed from the stem 20. The completed joint may be tested by an air line connected to the fitting of the pressure gauge 42 as shown in FIGURE 9, after which the stem 20 is closed by a plug 44 as shown in FIGURE 7.

In the preferred embodiment shown in FIGURES 10, 11 and 12, the resin saturated glass cloth is wrapped around two spaced portions of the pipe 15 as in the preceding embodiment, to form the spaced wrappings 17. The semicircular stops 34 and 36 of similar material are applied to the pipe 15 at each end of the wrappings 17, and additional adhesive is applied between the stops. Over these wrappings are applied mating portions 46 and 48 of a split bridge T fitting which has no lateral flanges.

In this form the mating portions of the split bridge are drawn together at each end by clamping devices such as canvas belts 50 shown in FIGURE 10, which are pulled up tight by a screw 52, and squeeze some of the adhesive out between the mating edges. A strip 54 of epoxy resin saturated glass cloth is placed along the split to cover these edges.

Long lengths of resin saturated glass cloth 56 and 58 are now wound spirally from each end toward the center of the split bridge, and there wound diagonally as at 60 and 62, to completely wrap up the joint between the canvas belts. After the resin has been cured, the shell cutter 40 is employed to sever the pipe, and the canvas belts are removed before the joint is put into service.

The elimination of the side flanges makes for an easier and more economical installation. The end product is much neater, form fitting to the pipe, and the completely wrapped insulator joint forms protection against corrosion thereof.

From the foregoing description it will be readily apparent that the applicants have provided one fitting instead of three with the direct and related savings in cost, plus the application of the well known and established high adhesion of epoxy resins to the securing of the device permanently to the pipe, and at the same time utilizing the equally high dielectric properties of the epoxy resin to provide the insulating joint. The application of the resin reinforced roving provides a seal against leakage, because of its high strength and adhesion it prevents the possibility of the pipe pulling out of the device, and providing high insulating properties.

What is claimed is:

1. Method of interrupting the electrical continuity of a pipe and insulating the interrupted ends from each other, which comprises exposing a length of said pipe, encircling spaced portions of said exposed length with insulating material, applying to the outside of said length a split bridge T fitting having a stem and bridge both of larger diameter than said pipe, clamping said encircled portions between the respective ends of said split bridge, passing a cutter through said stem to sever a section of the pipe between said encircled portions, removing the cutter and said severed pipe section, and thereafter plugging said stem.

2. Method of interrupting the electrical continuity of a pipe and insulating the interrupted ends from each other as claimed in claim 1, in which the greater part of said pipe other than said exposed portion is buried in the ground, and at least the exposed portion of the pipe contains fluid while the recited steps are being performed.

3. Method of interrupting the electrical continuity of a pipe and insulating the interrupted ends from each other as claimed in claim 1, in which said cutter is driven by a drilling machine sealed to the outer end of said stem.

4. Method of interrupting the electrical continuity of a pipe and insulating the interrupted ends from each other as claimed in claim 1, in which said insulating material comprises epoxy resin.

5. Method of interrupting the electrical continuity of a pipe and insulating the interrupted ends from each other as claimed in claim 1, in which said insulating material contains glass fibers.

6. Method of interrupting the electrical continuity of a pipe and insulating the interrupted ends from each other as claimed in claim 1, in which said clamping action is effected by belts pulled tight by a screw for drawing the respective parts of said split bridge toward each other with said encircled portions therebetween, wrapping said so drawn split bridge parts with high tensile strength insulating fiber saturated with fast setting adhesive insulating material.

7. Method of interrupting the electrical continuity of a pipe and insulating the interrupted ends from each other as claimed in claim 6, in which said adhesive insulating material is an epoxy resin formulation.

8. Method of interrupting the electrical continuity of a pipe and insulating the interrupted ends from each other as claimed in claim 6, in which said wrapping is spiral at each side of the center, and there wound diagonally about the fitting stem.

9. Pipe joint comprising a length of exposed pipe, insulating adhesive material encircling spaced portions of said pipe, a split bridge T fitting having a stem and a bridge both of larger diameter than said pipe, the greater part of the split fitting being cylindrical and concentric with the pipe, lateral longitudinal flanges on the mating portions of said split bridge, additional insulating adhesive material between said flanges, said flanges being bolted together with adhesive thickness spacers of rigid material therebetween to clamp said insulating adhesive material between the split portions of said bridge, an intermediate section of said pipe between said spaced portions being absent.

10. Split bridge insulated pipe fitting having a stem and a bridge split axially and extending in opposite directions transversely to said stem and for a greater distance than said stem, the mating portions of said split bridge having coextensive lateral flanges, insulating adhesive material between said flanges, said flanges being bolted together with adhesive thickness spacers of rigid material therebetween.

11. Split bridge insulated pipe fitting as claimed in claim 10, in which inner and outer dams of elastic material are mounted on at least one of said flanges to retain the lateral spread of adhesive material therebetween.

12. Split bridge insulated pipe T fitting as claimed in claim 10, in which semicircular stops of insulating material are mounted in the mating portions of said bridge at the outer ends thereof and at the inner portions adjacent said stem to prevent the longitudinal spread of adhesive material therebetween.

References Cited

UNITED STATES PATENTS

| 1,743,338 | 1/1930 | Field | 138—94 |
| 2,940,787 | 6/1960 | Goodner | 285—47 X |
| 2,379,990 | 7/1945 | Rembert. | |
| 2,680,631 | 6/1954 | Smith | 285—156 X |
| 2,924,546 | 2/1960 | Shaw | 285—293 X |

FOREIGN PATENTS

| 965,005 | 6/1957 | Germany. |
| 1,150,700 | 8/1957 | France. |
| 280,039 | 11/1964 | Netherlands. |

CARL W. TOMLIN, *Primary Examiner.*

R. G. BERKLEY, *Assistant Examiner.*